(12) United States Patent
Miyashiro et al.

(10) Patent No.: US 8,056,918 B2
(45) Date of Patent: Nov. 15, 2011

(54) SADDLE RIDING TYPE VEHICLE INCLUDING STEERING DAMPER

(75) Inventors: Shidehiko Miyashiro, Shizuoko (JP); Nobuo Hara, Shizuoka (JP); Naoyuki Hosono, Shizuoka (JP); Yasufumi Takagi, Shizuoka (JP); Takayuki Suzuki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 12/765,134

(22) Filed: Apr. 22, 2010

(65) Prior Publication Data
US 2010/0270773 A1  Oct. 28, 2010

(30) Foreign Application Priority Data

Apr. 24, 2009  (JP) .................... 2009-106265

(51) Int. Cl.
*B62K 1/08* (2006.01)
(52) U.S. Cl. ........................................ 280/272
(58) Field of Classification Search .............. 188/267.2; 280/272, 89
See application file for complete search history.

(56) References Cited

U.S. PATENT DOCUMENTS

| | | | | |
|---|---|---|---|---|
| 6,708,795 | B2 * | 3/2004 | Hasegawa et al. | 180/423 |
| 7,021,642 | B2 * | 4/2006 | Sato et al. | 280/272 |
| 7,044,489 | B2 * | 5/2006 | Bunya et al. | 280/272 |
| 7,712,756 | B2 * | 5/2010 | Seki et al. | 280/272 |
| 2009/0302557 | A1 * | 12/2009 | Hara et al. | 280/5.512 |

FOREIGN PATENT DOCUMENTS

JP   2000-203481 A   7/2000

* cited by examiner

*Primary Examiner* — Tony H. Winner
(74) *Attorney, Agent, or Firm* — Keating & Bennett, LLP

(57) ABSTRACT

A saddle riding type vehicle includes a vehicle body frame, a head pipe, a steering shaft, and a steering damper. The head pipe is attached to the front end of the vehicle body frame. The steering shaft is inserted rotatably in the head pipe. The steering damper includes an electromagnet, a magnetic member, and a magnetic fluid. The electromagnet is provided around the steering shaft and has a first surface. The magnetic member is provided around the steering shaft and has a second surface opposed to the first surface. The magnetic fluid is stored in a gap formed between the first and second surfaces. One of the electromagnet and the magnetic member is attached to the steering shaft and the other is attached to the head pipe.

20 Claims, 14 Drawing Sheets

SADDLE RIDING TYPE VEHICLE INCLUDING STEERING DAMPER

BACKGROUND OF THE INVENTION

1. Field of the Invention

The present invention relate to saddle riding type vehicles, and more specifically to a saddle riding type vehicle including a steering damper.

2. Description of the Related Art

Steering dampers are used in some cases in saddle riding type vehicles such as a motorcycle, an ATV (All Terrain Vehicle), and a snowmobile. The steering damper is used to damp the oscillation of a steering mechanism such as a steering wheel or steering handle.

A steering damper disclosed by JP 2000-203481 A is provided coaxially with a steering shaft. The disclosed steering damper includes a plurality of movable side disk plates, a plurality of fixed side disk plates, and a casing. The plurality of movable side disk plates rotate in synchronization with the steering shaft. The plurality of fixed side disk plates are attached to the casing. The casing stores a viscous fluid. The disclosed steering damper damps the oscillation of the front wheel during traveling using the viscous fluid.

However, the steering damper disclosed in JP 2000-203481 A cannot change the damping force.

SUMMARY OF THE INVENTION

In view of the above-described issue, preferred embodiments of the present invention provide a saddle riding type vehicle including a steering damper capable of changing its damping force.

A saddle riding type vehicle according to a preferred embodiment of the present invention includes a vehicle body frame, a head pipe, a steering shaft, and a steering damper. The head pipe is attached to the front end of the vehicle body frame. The steering shaft is inserted rotatably in the head pipe. The steering damper includes an electromagnet, a magnetic member, and a magnetic fluid. The electromagnet is provided around the steering shaft and has a first surface. The magnetic member is provided around the steering shaft and has a second surface opposed to the first surface. The magnetic fluid is stored in a gap formed between the first and second surfaces. One of the electromagnet and the magnetic member is attached to the steering shaft and the other is attached to the head pipe.

In a saddle riding type vehicle according to a preferred embodiment of the present invention, the apparent viscosity of the magnetic fluid is changed by the electromagnet. Therefore, the damping force of the steering damper is changed.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
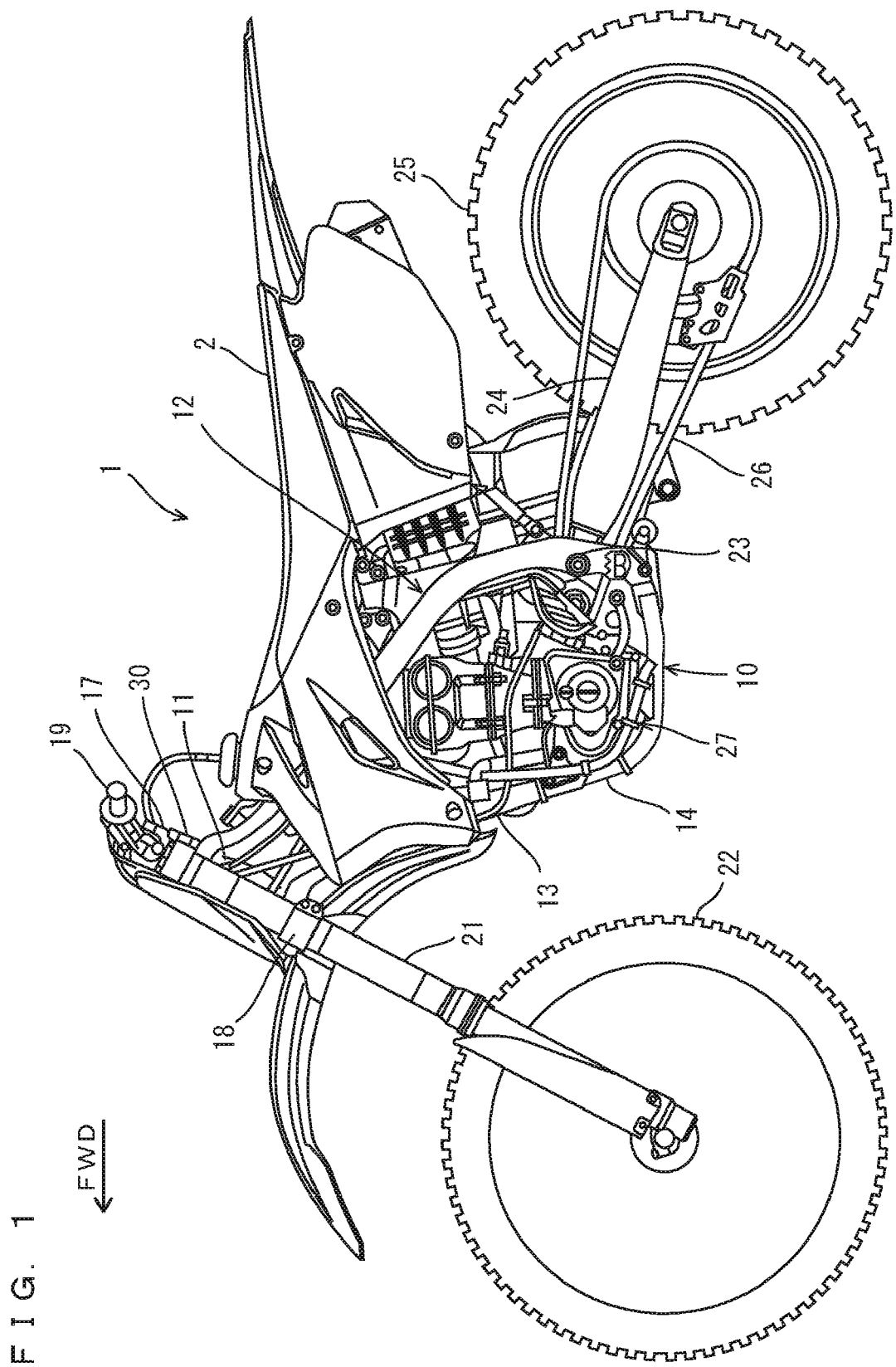
FIG. 1 is a side view of a saddle riding type vehicle according to a first preferred embodiment of the present invention.

Now, preferred embodiments of the present invention will be described in detail in conjunction with the accompanying drawings. In the drawings, the same or corresponding portions are designated by the same reference characters and their description will not be repeated.

First Preferred Embodiment

FIG. 1 is a left side view of a saddle riding type vehicle 1 with respect to the forward direction (FWD) according to a first preferred embodiment of the present invention. The "saddle riding type vehicle" includes a motorcycle, an ATV (All-Terrain Vehicle), a snowmobile, and the like. The "motorcycle" includes a scooter, a moped, and the like. As shown in FIG. 1, the saddle riding type vehicle 1 preferably is an off-road motorcycle, for example. An example of the off-road motorcycle is a motocross bike. As described above, the saddle riding type vehicle according to the present preferred embodiment is not limited to such an off-road motorcycle.

The saddle riding type vehicle 1 includes a vehicle body frame 10, a head pipe 11, a handle 19, a seat 2, an engine 27, a pair of front forks 21, a front wheel 22, a rear arm 24, a chain 26, and a rear wheel 25.

The head pipe 11 is attached to the front end of the vehicle body frame 10. The handle 19 is attached rotatably to the upper portion of the head pipe 11. The head pipe 11 is provided between the pair of front forks 21. The pair of front forks 21 extends downward from the head pipe 11. The front wheel 22 is attached rotatably to lower ends of the pair of front forks 21.

A pivot shaft 23 is provided at the rear portion of the vehicle body frame 10. The rear arm 24 is supported around the pivot shaft 23 at the front end so that it can swing in the vertical direction. The rear wheel 25 is attached rotatably at the rear end of the rear arm 24.

The seat 2 is provided above the vehicle body frame 10. The engine 27 is provided under the seat 2 and attached to the vehicle body frame 10. The chain 26 is provided between the engine 27 and the rear wheel 25 to transmit the power of the engine 27 to the rear wheel 25.

Figure 2:
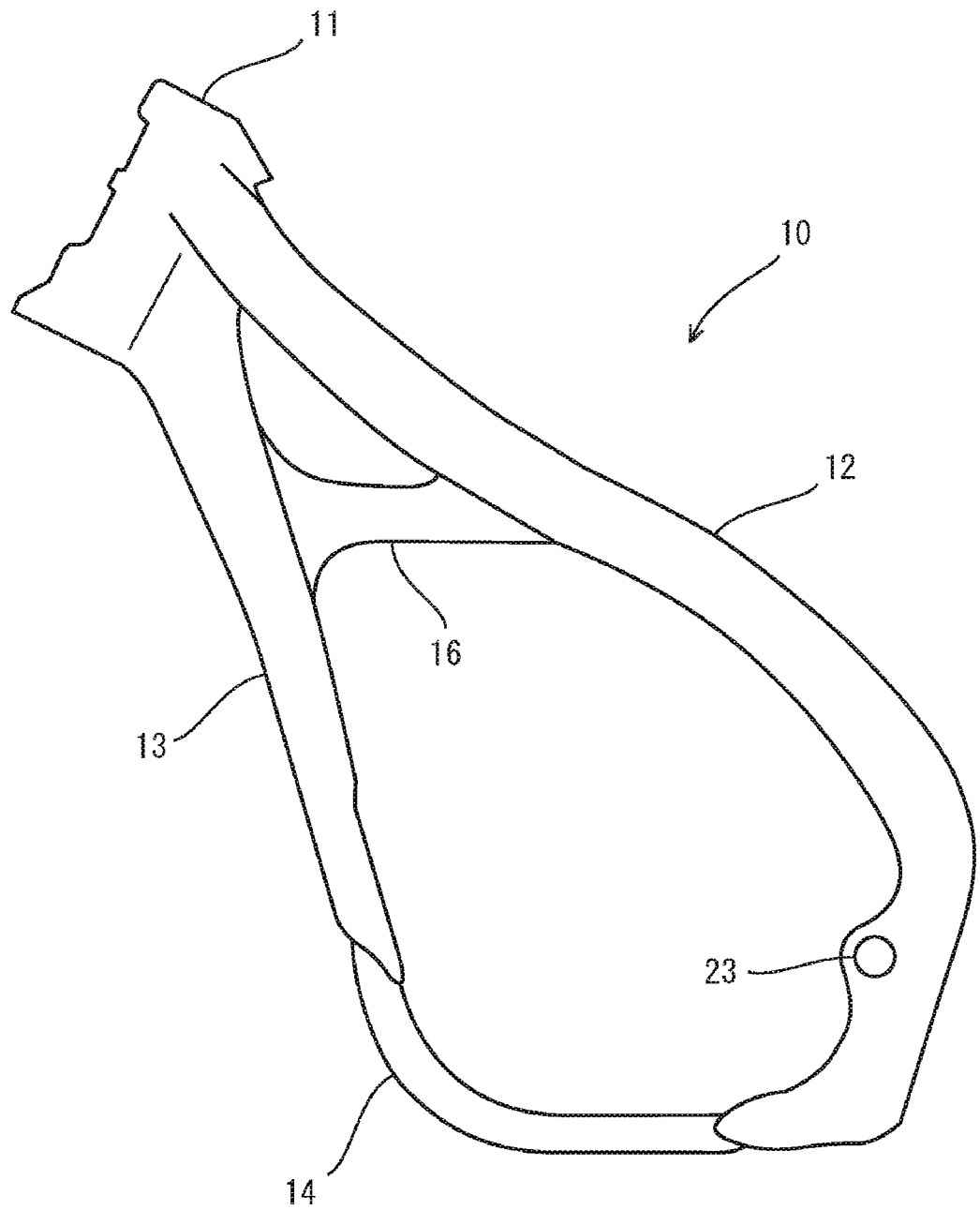
FIG. 2 is a side view of a vehicle body frame and a head pipe shown in FIG. 1.

FIG. 2 is a side view of the vehicle body frame 10 and the head pipe 11. Referring to FIG. 2, the head pipe 11 is tubular and extends downward and slightly forward. The vehicle 10 includes frames 12 to 14 and 16.

The frame 12 extends backward and obliquely downward from the head pipe 11. The rear portion of the frame 12 is curved and the rear end of the frame 12 is suspended downward. The frame 13 extends downward and slightly backward from the rear end of the head pipe 11. The frame 14 is provided between the rear end of the frame 12 and the rear end of the frame 13. The frame 16 is provided between the front portion of the frame 12 and the front portion of the frame 13. The frame 16 improves the rigidity of the vehicle body frame 10.

Figure 3:
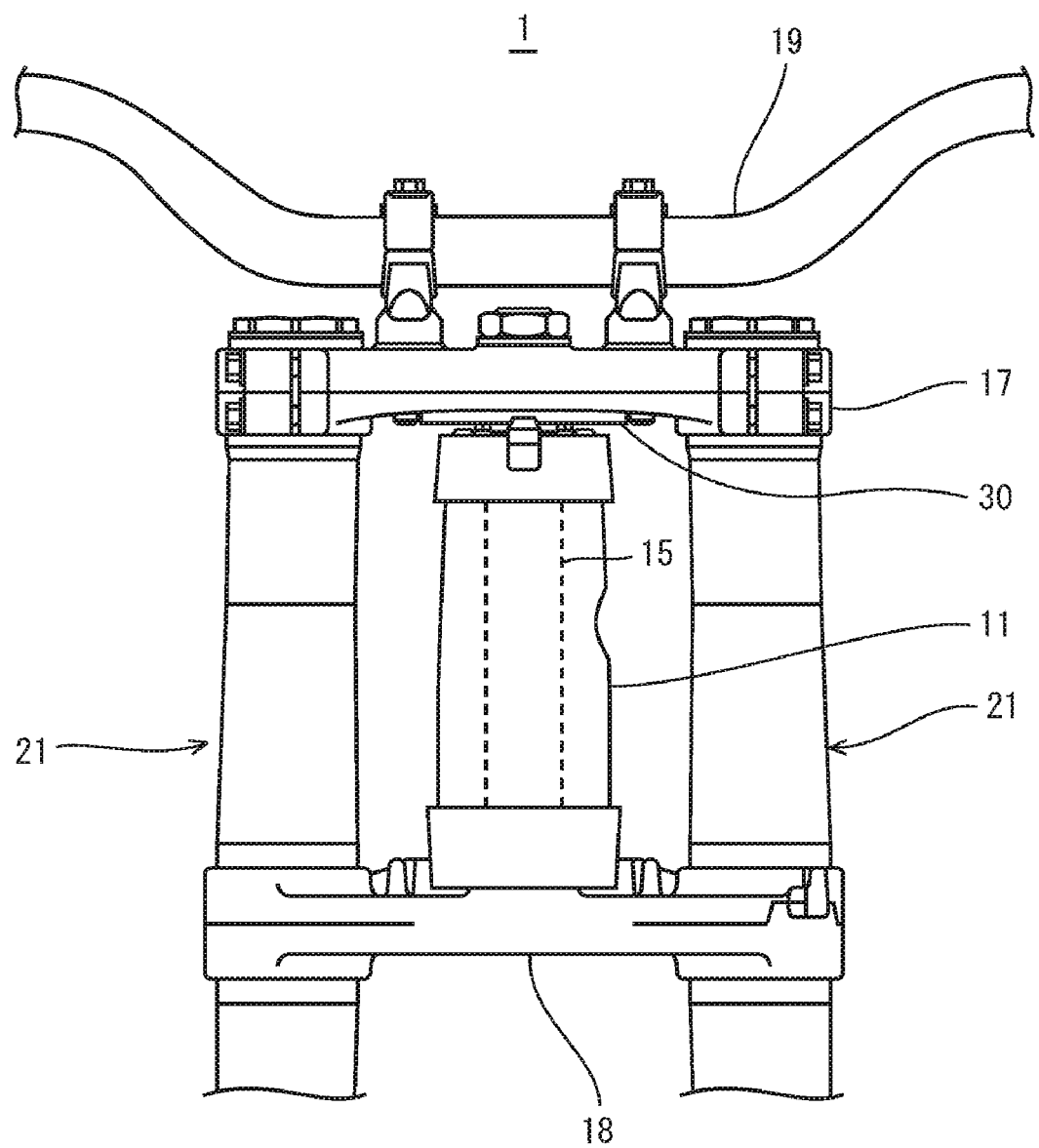
FIG. 3 is a front view of the head pipe and its periphery in FIG. 1.

FIG. 3 is a front view of the head pipe 11 and its periphery. Referring to FIG. 3, the saddle riding type vehicle 1 further includes an upper bracket 17 and an under bracket 18. The upper bracket 17 is provided above the head pipe 11. The under bracket 18 is provided under the head pipe 11. More specifically, the head pipe 11 is provided between the upper bracket 17 and the under bracket 18.

The saddle riding type vehicle 1 further includes a steering shaft 15. The steering shaft 15 has a rod shape and is inserted rotatably in the head pipe 11.

The upper bracket 17 includes a beam shaped member. The left and right ends of the upper bracket 17 have a pair of through holes corresponding to the pair of the front forks 21. A through hole corresponding to the steering shaft 15 is formed in the center of the upper bracket 17.

The under bracket 18 includes a beam shaped member. The left and right ends of the under bracket 18 have a pair of through holes corresponding to the pair of front forks 21.

The pair of front forks 21 and the steering shaft 15 are fixed to the upper bracket 17 and the under bracket 18. The pair of front forks 21 is inserted to the through holes formed at the ends of the upper bracket 17 and the ends of the under bracket 18 and attached to the upper bracket 17 and the under bracket 18. The steering shaft 15 is inserted in the through hole formed in the center of the upper bracket 17 and attached to the upper bracket 17. The handle 19 is attached at the upper surface of the upper bracket 17.

In short, the steering shaft 15 and the pair of front forks 21 are attached to the handle 19. When the handle 19 is turned to the left and right, the steering shaft 15 and the pair of front forks 21 turn to the left and right together with the handle 19 and the front wheel 22 also turns to the left and right.

Figure 4:
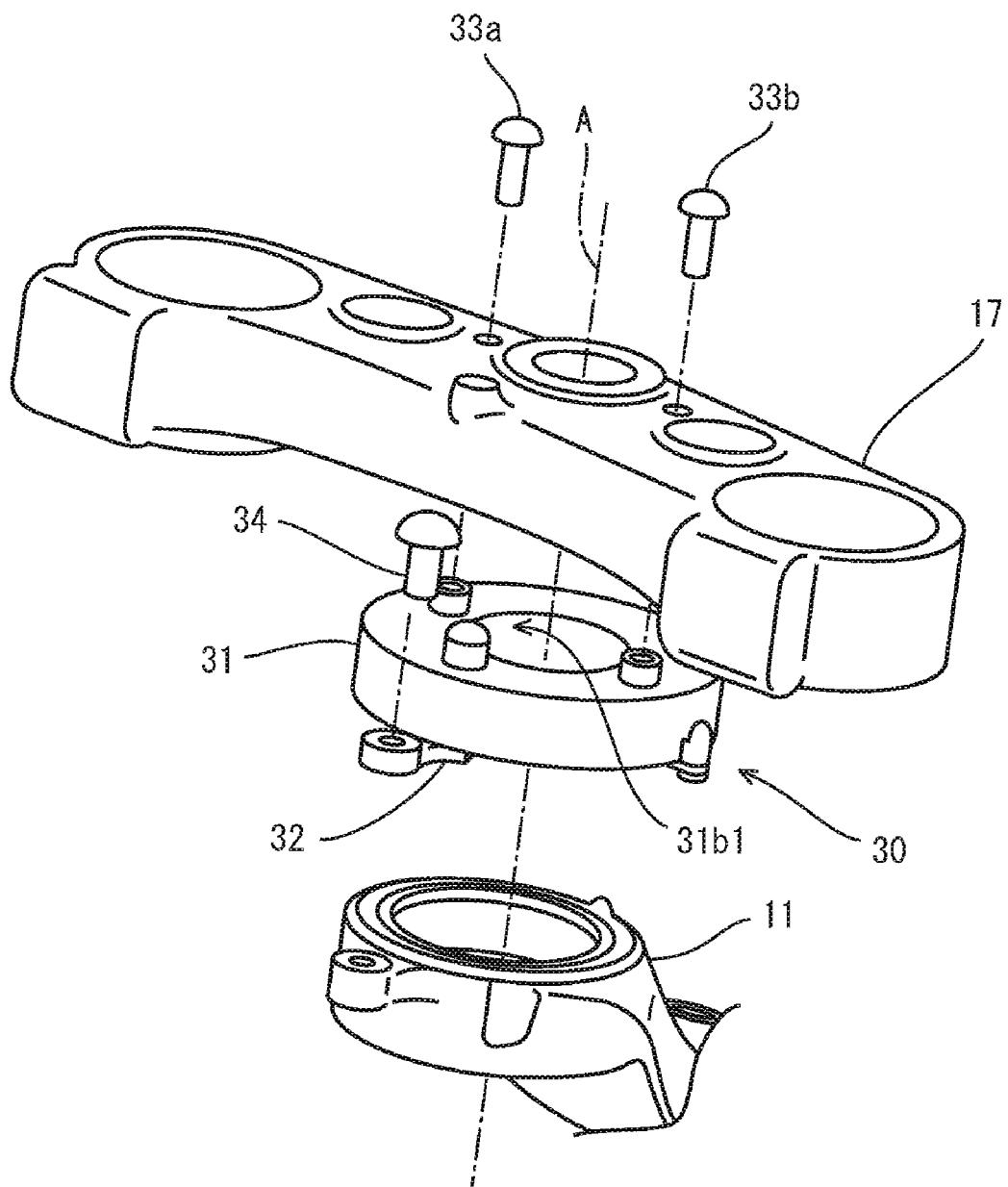
FIG. 4 is an exploded perspective view of a steering damper and its periphery in FIG. 1.

Referring to FIG. 3, the saddle type riding vehicle 1 further includes a steering damper 30. FIG. 4 is an exploded perspective view of the steering damper 30 and its periphery. Referring to FIGS. 3 and 4, the steering damper 30 is provided between the head pipe 11 and the upper bracket 17. The steering damper 30 has a through hole 31b1. More specifically, the steering damper 30 has an annular shape. The steering damper 30 is provided coaxially with the head pipe 11. The steering shaft 15 is inserted in the through hole 31b1.

Figure 5:
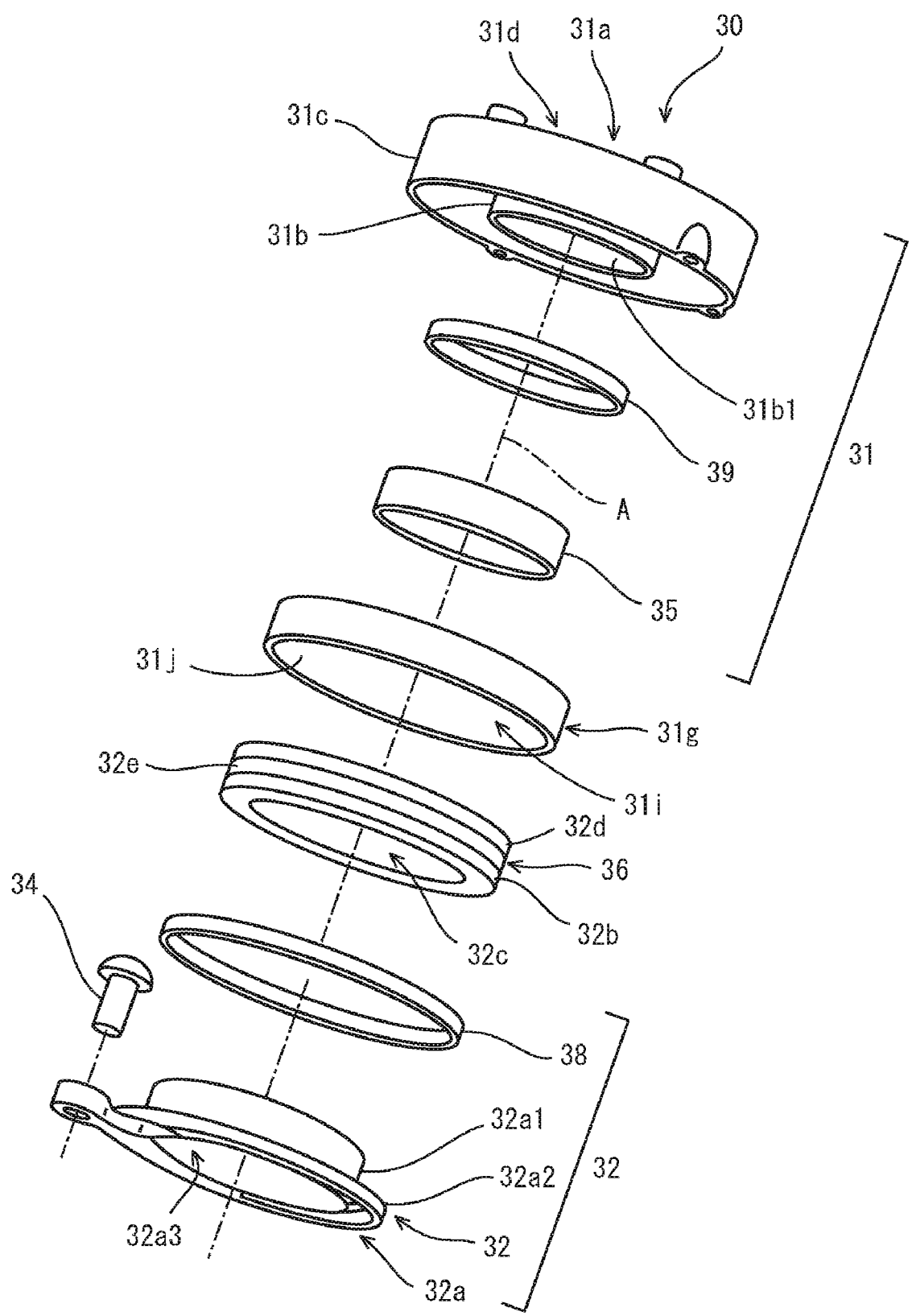
FIG. 5 is an exploded perspective view of the steering damper shown in FIG. 4.

FIG. 5 is an exploded perspective view of the steering damper 30. The steering shaft 15 is provided along the axial line A in FIG. 5.

The steering damper 30 includes an electromagnet 36 and a magnetic member 31g. The electromagnet 36 is annular and has a through hole 32c. The steering shaft 15 provided along the axial line A is inserted in the through hole 32c. More specifically, the electromagnet 36 is provided around the steering shaft 15. The electromagnet 36 further has an outer circumferential surface 32d.

The electromagnet 36 includes a coil 32e and a magnetic main body 32b. The magnetic main body 32b contains a well known ferromagnet. The ferromagnet is, for example, a metal such as iron, nickel, and manganese. The ferromagnet may also be an alloy containing iron, nickel, manganese, or other suitable material, for example. An example of the alloy is manganese zinc ferrite. The magnetic main body 32b has an annular groove. The annular groove extends in the circumferential direction of the outer circumferential surface 32d.

The coil 23e is annular and provided in the groove of the magnetic main body 32b. More specifically, the coil 32e is provided at the outer circumferential surface 32d. The coil 32e is supplied with power from the outside. The electromagnet 36 generates a magnetic field when it is supplied with power.

The magnetic member 31g is annular and has a through hole 31i. The steering shaft 15 is inserted in the through hole 31i. More specifically, the magnetic member 31g is provided around the steering shaft 15. The magnetic member 31g further has an inner circumferential surface 31j. The magnetic member 31g contains a well-known ferromagnet.

The steering damper 30 further includes lid members 31 and 32. The lid member 31 is provided above the electromagnet 36 and the magnetic member 31g. The lid member 32 is provided under the electromagnet 36 and the magnetic member 31g. More specifically, the electromagnet 36 and the magnetic member 31g are provided between the lid members 31 and 32. As shown in FIG. 5, the electromagnet 36 and the magnetic member 31g are provided coaxially with the lid members 31 and 32.

The lid member 31 includes a main body 31a, an annular seal member 39, and an annular wear resistant member 35. The main body 31a has the through hole 31b1. The lid member 32 includes a main body 32a and a seal member 38. The main body 32a has a through hole 32a3. The lid members 31 and 32 are preferably of a material other than a ferromagnet. The lid members 31 and 32 are, for example, made of aluminum or an aluminum alloy.

Figure 6:
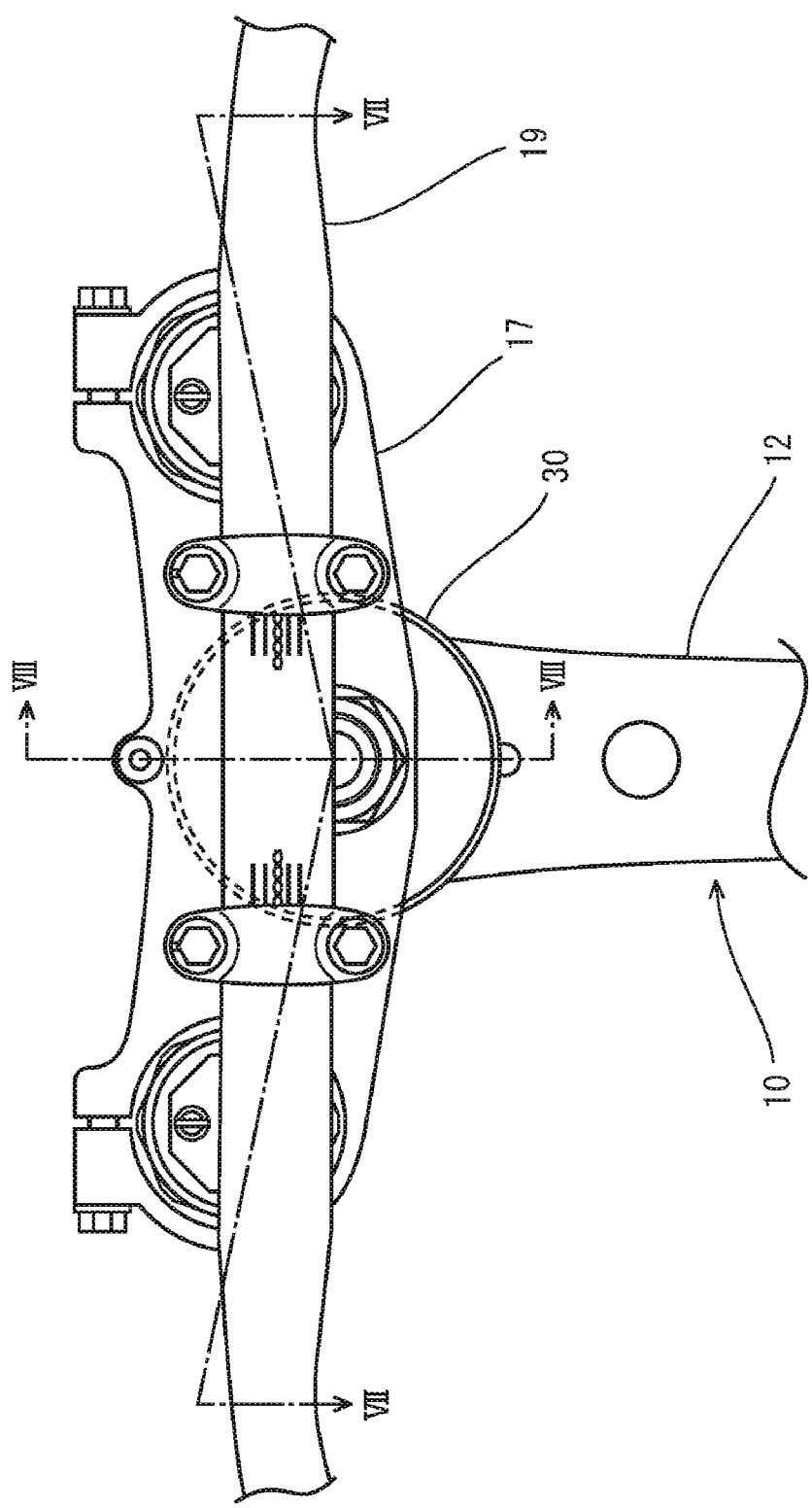
FIG. 6 is a plan view of the steering damper and its periphery in FIG. 1.
Figure 7:
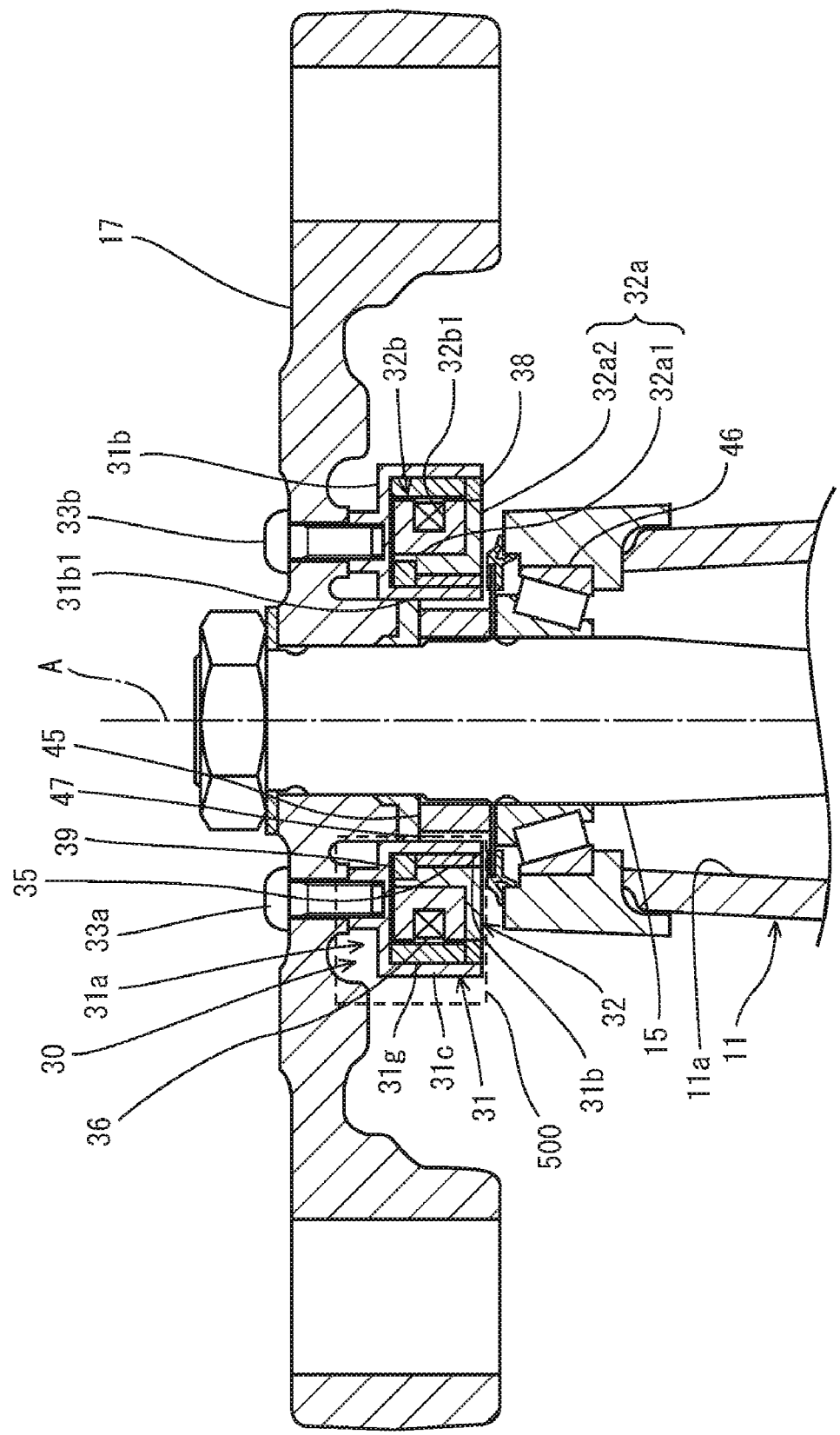
FIG. 7 is a sectional view taken along line VII-VII in FIG. 6.

FIG. 6 is a plan view of the steering damper 30 and its periphery. FIG. 7 is a sectional view taken along line VII-VII in FIG. 6.

Referring to FIG. 7, the steering shaft 15 is inserted rotatably in the through hole 11a of the head pipe 11. A bearing 46 is provided above the head pipe 11. The steering shaft 15 is inserted in the bearing 46. Therefore, the steering shaft 15 is provided in the head pipe 11 rotatably around the axis A.

The steering shaft 15 is further inserted in an annular collar 45. The collar 45 is fixed to the steering shaft 15. The collar 45 is provided on the bearing 46 and the lower end of the collar 45 is contacted to the upper end of the bearing 46. The upper end of the collar 45 is contacted to the lower surface of the upper bracket 17. Therefore, the steering shaft 15 is not easily moved in the vertical direction.

The steering shaft 15 is further inserted in the steering damper 30 and the upper bracket 17. The steering damper 30 is provided between the upper bracket 17 and the head pipe 11.

The lid member 31 of the steering damper 30 is attached to the upper bracket 17 by bolts 33a and 33b. As described above, the steering shaft 15 is also attached to the upper bracket 17. Therefore, the lid member 31 is attached indirectly to the steering shaft 15 and rotates together with the steering shaft.

Figure 8:
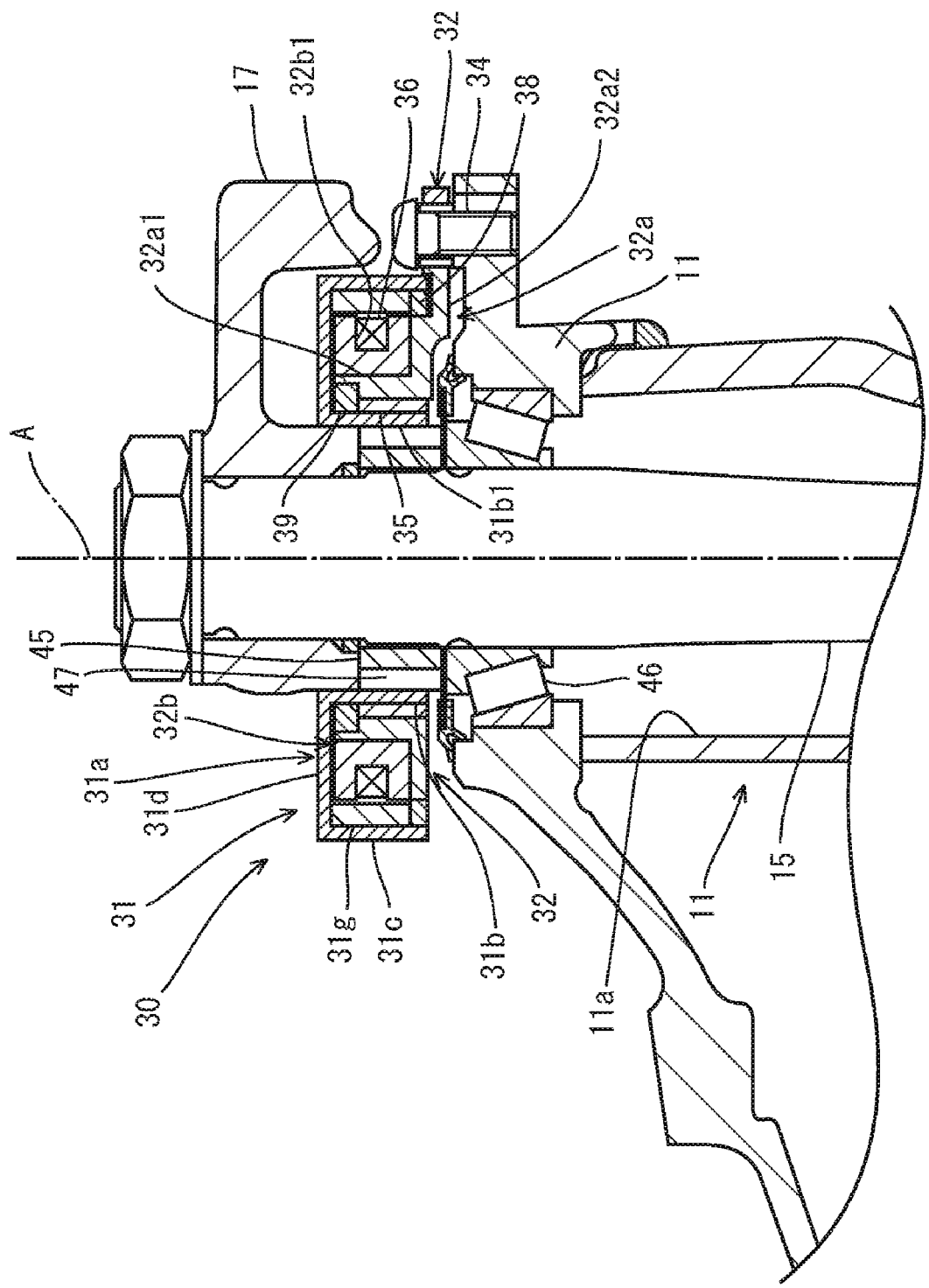
FIG. 8 is a sectional view taken along line VIII-VIII in FIG. 6.

FIG. 8 is a sectional view taken along line VIII-VIII in FIG. 6. Referring to FIG. 8, the lid member 32 of the steering damper 30 is attached to the head pipe 11 by a bolt 34. Therefore, the lid member 32 does not rotate together with the steering shaft 15.

In short, the lid member 31 of the steering damper rotates relatively to the lid member 32.

Referring to FIGS. 5, 7 and 8, the electromagnet 36 is provided in the through hole 31*i* of the magnetic member 31*g*. The magnetic member 31*g* is attached to the lid member 31. Meanwhile, the electromagnet 36 is attached to the lid member 32.

In short, the magnetic member 31*g* is attached indirectly to the steering shaft 15 and the electromagnet 36 is attached indirectly to the head pipe 11. The magnetic member 31*g* rotates together with the steering shaft 15 and the electromagnet 36 does not rotate together with the steering shaft 15. Therefore, when the handle 19 is turned to the left or right, the magnetic member 31*g* turns relatively to the electromagnet 36.

Figure 9:
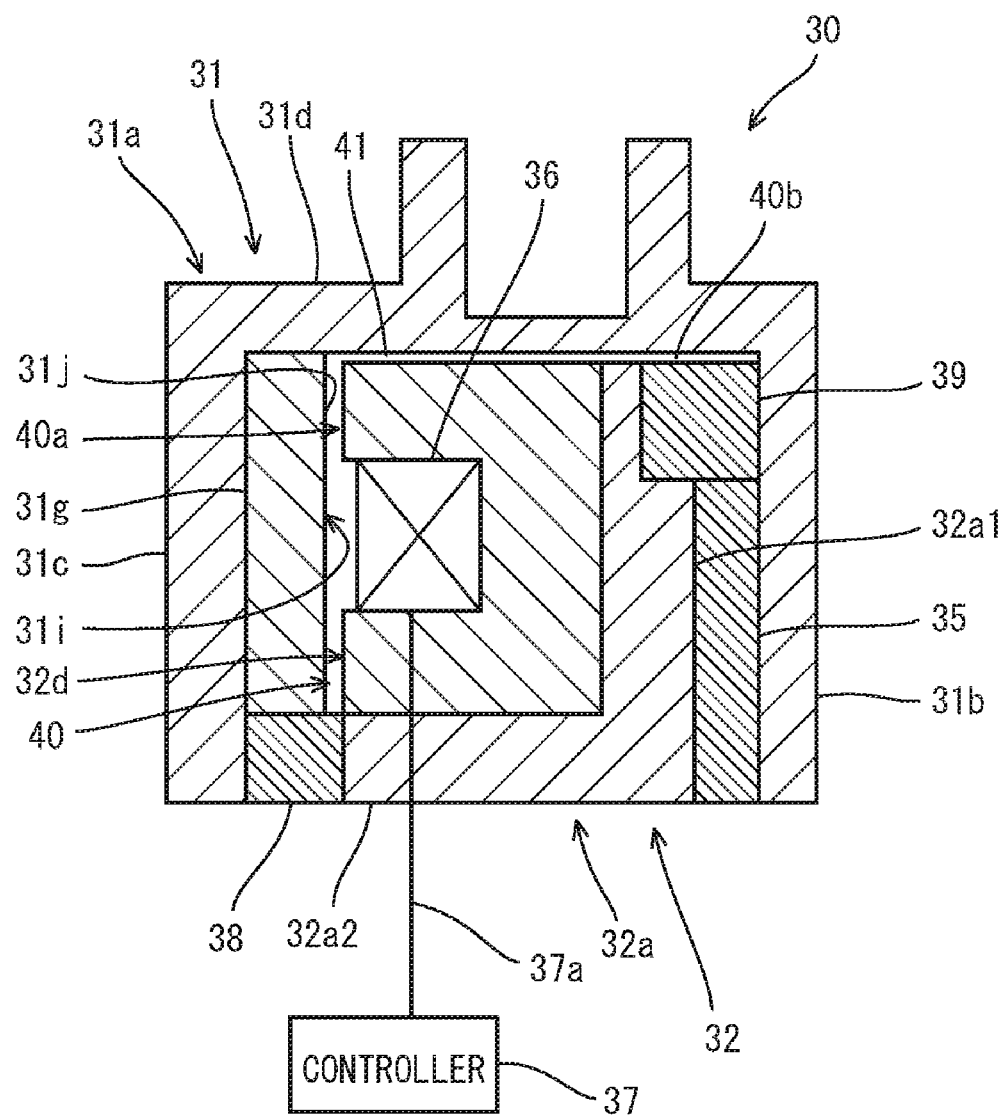
FIG. 9 is a sectional view of the steering damper shown in FIG. 7.

FIG. 9 is a sectional view of the steering damper 30 in the region 500 surrounded by the broken line in FIG. 7. Referring to FIG. 9, the electromagnet 36 is provided in the through hole 31*i* of the magnetic member 31*g* as described above. There is a gap 40*a* formed between the magnetic member 31*g* and the electromagnet 36. More specifically, the inner circumferential surface 31*j* of the magnetic member 31*g* is opposed to the outer circumferential surface 32*d* of the electromagnet 36. The gap 40*a* is formed between the inner and outer circumferential surfaces 31*j* and 32*d*. Therefore, according to the present preferred embodiment, the gap 40*a* preferably has an annular shape.

The saddle riding type vehicle 1 further includes magnetic fluid 41. The magnetic fluid 41 is stored in the gap 40*a*. The "magnetic fluid" in this description means a fluid whose apparent rheology property changes when an external magnetic field is applied thereon. The gap 40*a* is provided between the electromagnet 36 and the magnetic member 31*g*. Therefore, when the electromagnet generates a magnetic field, the magnetic field is applied on the gap 40*a*. The magnetic fluid 41 changes reversibly from the liquid state into a semi-solid state having a yield point. At the time, the apparent viscosity of the magnetic fluid 41 changes. The viscosity change causes the steering damper 30 to damp its rotation.

The magnetic fluid 41 is not particularly limited as long as it is a well known magnetic fluid. The magnetic fluid 41 is, for example, a magneto-rheological fluid (hereinafter referred to as the "MR fluid") or a magnetic compound fluid.

The MR fluid is slurry having ferroelectric particles dispersed in a liquid. The particle size of the ferromagnetic particles is about several ten nanometers or less. The ferromagnetic particles are preferably made of a metal such as iron, nickel, and manganese. The ferromagnetic particles may be an alloy containing iron, nickel, manganese or other suitable material, for example. An example of the alloy is manganese zinc ferrite. A surfactant layer may be formed on the surface of the ferromagnetic particles. When the surfactant layer is formed on the surface of the ferromagnetic particles, the ferromagnetic particles are not easily agglutinated.

The liquid in which the ferromagnetic particles are dispersed may be water, an aqueous solution, or an organic solvent such as isoparaffin, alkylnaphthalene, and perfluoropolyether, for example.

When no magnetic field is applied, the magnetic fluid is a Newtonian fluid. When the magnetic fluid 41 is an MR fluid, the ferromagnetic particles in the magnetic fluid are substantially homogeneously dispersed in the liquid.

Meanwhile, when a magnetic field is applied, magnetic domains in the magnetic fluid 41 are magnetically polarized. When the magnetic fluid 41 is an MR fluid, a binding force is generated among the ferromagnetic particles in response to an applied magnetic field, and a plurality of ferromagnetic particles form a cluster. The clusters of the ferromagnetic particles form a cross linked structure that extends in the direction of a line of magnetic flux. As the cross linked structure is formed, the apparent viscosity of the magnetic fluid increases. The effect of the increase in the apparent viscosity is called magnetic resistance effect. The magnetic fluid 41 subjected to the magnetic resistance effect becomes a Bingham fluid having yield stress.

In short, the magnetic fluid 41 has its apparent viscosity increased when a magnetic field is applied thereon. The apparent viscosity of the magnetic fluid 41 changes depending on the magnitude of the magnetic field. More specifically, the apparent viscosity of the magnetic fluid 41 increases as the applied magnetic field is greater and decreases as the applied magnetic field is smaller.

Referring to FIG. 9, the saddle riding type vehicle 1 further includes a controller 37. The controller 37 is, for example, an ECU (Electronic Control Unit). A wire 37*a* is connected to the controller 37. The electromagnet 36 is also connected with the wire 37*a*. The wire 37*a* supplies the electromagnet 36 with power.

The controller 37 controls power to be supplied to the electromagnet 36. The electromagnet 36 is supplied with the power to generate a magnetic field. The electromagnet 36 generates a magnetic field corresponding to the supplied power. Therefore, the controller 37 controls the magnitude of the magnetic field generated at the electromagnet.

Referring to FIGS. 5, 7, and 9, the lid member 31 includes a main body 31*a*, a seal member 39, and a wear resistant member 35.

The main body 31*a* is a case having its lower portion opened and has the through hole 31*b*1. The main body 31*a* includes a substrate 31*d*, an outer circumferential wall 31*c*, and an inner circumferential wall 31*b*. The substrate 31*d* is a disk having a through hole in the center. The outer circumferential wall 31*c* is annular and provided at the outer circumferential edge of the substrate 31*d*. The inner circumferential wall 31*b* is annular and provided on the inner side of the outer circumferential wall 31*c*. As shown in FIG. 9, the magnetic member 31*g* is attached to the inner circumferential surface of the outer circumferential wall 31*c*.

The wear resistant member 35 and the seal member 39 are attached at the outer circumferential surface of the inner circumferential wall 31*b*. An example of the wear resistant member 35 is a slide metal. The lid member 32 is contacted to the wear resistant member 35. Therefore, when the lid member 31 rotates, the lid member 32 slides in the circumferential direction on the wear resistant member 35.

The seal member 39 is provided on the wear resistant member 35. The seal member 39 is an elastic member of for example rubber or synthetic resin. The seal member 39 is for example a well-known oil seal.

Details of Lid Member 32

Referring to FIGS. 5, 7, and 9, the lid member 32 includes the main body 32*a* and the seal member 38.

The main body 32*a* has a through hole 32*a*3. The main body 32*a* includes a substrate 32*a*2 and a circumferential wall 32*a*1. The substrate 32*a*2 is a disk having a through hole in the center. The circumferential wall 32*a*1 is annular and provided at the inner circumferential edge of the substrate 32*a*2. When the lid member 32 is combined with the lid member 31, the seal member 39, the wear resistant member 35 and an inner circumferential 31*b* are inserted into the circumferential wall 31*b*. The seal member is provided between the substrate 32*a*2 and the outer circumferential wall 31*c*. The seal member 38 is an elastic member such as a well known oil seal similarly to the seal member 39.

As shown in FIG. 9, the electromagnet 36 is attached on the upper surface of the substrate 32a2 of the main body 32a.

Referring to FIG. 9, the lid member 31 is provided above the gap 40a. The lid 32 is provided under the gap 40a. The lid members 31 and 32 enclose the magnetic fluid 41 in the gap 40a.

The fluid storage chamber 40 is defined by the electromagnet 36, the magnetic member 31g, and the lid members 31 and 32 further in the steering damper 30. The fluid storage chamber 40 includes the gaps 40a and 40b. The gap 40b is formed between the lid member 31 and the electromagnet 36. The magnetic fluid 41 is stored in the fluid storage chamber 40. The magnetic fluid 41 is enclosed in the fluid storage chamber 40 by the lid members 31 and 32.

As described above, the steering damper 30 damps the rotation (oscillation) of the steering shaft 15 in response to a magnetic field generated by the electromagnet 36. Hereinafter, details of the operation of the steering damper 30 will be described.

When the electromagnet 36 does not generate a magnetic field, in other words, when the controller 37 stops supplying power to the electromagnet 36, the viscosity of the magnetic fluid 41 is low. Therefore, the damping force of the steering damper 30 is very small, and the steering shaft 15 readily rotates in response to the rider's operation of the handle 19. During normal traveling, the controller 37 stops supplying power to the electromagnet 36. Therefore, the steering shaft 15 is more easily turned.

On the other hand, when the angular speed of the steering shaft 15 increases abruptly, for example, because of disturbance, the controller 37 supplies the electromagnet 36 with power. At the time, the electromagnet 36 generates a magnetic field, which is applied on the gap 40a. The apparent viscosity of the magnetic fluid 41 in the gap 40a increases by the magnetic field. As a result, a damping effect is obtained, and large damping force acts on the rotation of the steering shaft 15. More specifically, shear force is generated between the electromagnet 36 and the magnetic member 31g. The shear force acts in the direction opposite to the rotation direction of the steering shaft 15. The electromagnet 36 is attached to the head pipe 11 and the magnetic member 31g is attached to the steering shaft 15. Therefore, the rotation of the steering shaft 15 is damped by the shear force.

The change in the apparent viscosity of the magnetic fluid 41 in response to change in the magnetic field is quick, and the change occurs on a basis of milliseconds. Therefore, the damping force of the steering damper 30 changes quickly.

The steering damper 30 generates large damping force when a magnetic field is applied on the magnetic fluid 41 stored in the gap 40a. Therefore, the steering damper 30 can change its damping force depending on the presence/absence of magnetic field application.

The controller 37 can control power to be supplied to the electromagnet 36 depending on the steering angle, the steering speed, the steering acceleration, or the like of the steering shaft 15 or may supply power in response to the rider's operation.

According to the above-described preferred embodiment, the magnetic member 31g is preferably attached to the steering shaft 15 indirectly through the lid member 31 and the upper bracket 17. However, the magnetic member 31g may be attached directly to the steering shaft 15. The lid member 31 may be attached directly to the steering shaft 15. The electromagnet 36 is preferably attached indirectly to the head pipe 11 through the lid member 32. Alternatively, the electromagnet 36 may be attached directly to the head pipe 11. In short, the magnetic member 31g is attached to the steering shaft 15 either directly or indirectly and the electromagnet 36 is attached to the head pipe 11 either directly or indirectly.

When upward force is applied on the front wheel 22, the steering shaft 15 is curved. When the lid member 31 is attached directly to the steering shaft 15, the curving of the steering shaft 15 allows the lid member 31 to be more easily inclined with respect to the lid member 32. Therefore, the width of the gap 40a (the distance between the outer circumferential surface 32d and the inner circumferential surface 31j) easily changes. As the width of the gap 40a changes, damping force generated by a magnetic field is not easily stabilized in some cases.

When the magnetic member 31g is attached indirectly to the steering shaft 15 through the lid member 31 and the upper bracket 17, the lid member 31 is not easily inclined with respect to the lid member 32 even with the curving of the steering shaft 15. Therefore, the width of the gap 40a is not easily changed, and the damping force is more likely to be stabilized.

When the lid member 31 is attached to the upper bracket 17, the steering damper 30 is more easily assembled to the saddle riding type vehicle 1 than when the lid member 31 is attached directly to the steering shaft 15.

Referring to FIGS. 7 and 8, a gap 47 is formed between the steering damper 30 and the steering shaft 15. Therefore, if the steering shaft 15 is curved by an external force applied thereon, the external force applied to the steering shaft 15 is not easily transmitted to the steering damper 30. The steering damper 30 is therefore less affected by the external force applied on the steering shaft 15.

According to the present preferred embodiment, the lid member 32 is preferably fitted between the wear resistant member 35 of the lid member 31 and the outer circumferential wall 31c. Therefore, the lid member 32 is not easily shifted in the horizontal direction (radial direction). However, the lid member 32 may be shifted in the vertical direction or more specifically in the direction of the axis A. The circumferential wall 32a1 of the lid member 32 may slide in the vertical direction on the wear resistant member 35.

If, for example, the steering shaft 15 is curved by an external force applied thereon and the lid member 32 is also subject to the external force, the lid member 32 may be shifted in the direction of the axis A. The lid member 32 is however less likely to shift in the horizontal direction (in the radial direction of the through hole 31b1). Therefore, the width of the gap 40a is less likely to change and the damping force is more easily stabilized.

According to the present preferred embodiment, the steering damper 30 is provided at the upper portion of the steering shaft 15. When the front wheel 22 receives an upward external force, the lower portion of the steering shaft 15 is most likely to deform and the upper portion of the steering shaft 15 is least likely to deform. The steering damper 30 is provided at the upper portion of the steering shaft 15 and is therefore not easily affected by external force applied on the front wheel 22.

The steering damper 30 is further attached indirectly to the steering shaft 15 through the upper bracket 17. Therefore, the steering damper 30 is less easily affected by external force applied on the front wheel 22, so that stable damping force can be generated.

According to the present preferred embodiment, the lid member 32 is provided with the electromagnet 36. The lid member 32 is attached to the head pipe 11. Therefore, if the steering shaft 15 rotates, the lid member 32 does not rotate. As shown in FIG. 9, the electromagnet 36 is connected with the wire 37a. The lid member 32 does not rotate and therefore the wire 37a is less prone to damage and thus hardly disconnected.

As described above, the magnetic fluid 41 in the gap 40a contributes to the generation of damping force. The gap 40a is formed between the inner circumferential surface 31j and the outer circumferential surface 32d of the electromagnet 36. Therefore, the size of the steering damper 30 in the axial direction can be reduced.

According to the present preferred embodiment, the electromagnet 36 is provided in the through hole 31i of the magnetic member 31g. However, the magnetic member 31g may be provided in the through hole 32c of the electromagnet 36. In this case, the outer circumferential surface of the magnetic member 31g is opposed to the inner circumferential surface of the electromagnet 36. Therefore, a gap 40a is formed between the outer circumferential surface of the magnetic member 31g and the inner circumferential surface of the electromagnet 36. In this way, the electromagnet 36 is attached, for example, at the inner circumferential surface of the outer circumferential wall 31c of the lid member 31 and the magnetic member 31g is attached on the substrate 32a2 of the lid member 32. The damping force depends on the distance between the gap 40a and the steering shaft 15. For a fixed distance between the gap 40a and the steering shaft 15, the steering damper has a greater width when the magnetic member 31g is provided in the through hole 32c of the electromagnet 36 than when the electromagnet 36 is provided in the through hole 31i of the magnetic member 31g. Therefore, as shown in FIG. 9, the electromagnet 36 is preferably provided in the through hole of the magnetic member 31g. On the other hand, if the magnetic member 31g is provided in the electromagnet 36, a damping effect can be provided.

According to the present preferred embodiment, the electromagnet 36 is preferably provided in the magnetic member 31g. However, the magnetic member 31g may be provided above the electromagnet 36. At the time, the shapes of the magnetic member 31g and the electromagnet 36 are set so that the lower surface of the magnetic member 31g is opposed to the upper surface of the electromagnet 36. In this way, the gap 40a is formed between the lower surface of the magnetic member 31g and the upper surface of the electromagnet 36, and the magnetic fluid is stored in the gap 40a. The electromagnet 36 may be provided above the magnetic member 31g.

According to the above-described preferred embodiment, the magnetic member 31g and the electromagnet 36 preferably have annular shapes. However, the magnetic member and the electromagnet may have shapes other than the annular shapes. The magnetic member and the electromagnet do not have to be provided at the entire circumference of the steering shaft 15. The magnetic member and the electromagnet may be provided along a semi-circumference of the steering shaft 15.

In short, in the steering damper according to the present preferred embodiment, the magnetic member and the electromagnet are arranged round the steering shaft 15. A certain surface of the magnetic member is opposed to a certain surface of the electromagnet. A gap is formed between the opposed surfaces of the magnetic member and the electromagnet, and the magnetic fluid is stored in the gap. The coil 32e is preferably provided at the surface of the electromagnet opposed to the surface of the magnetic member.

According to the above-described preferred embodiment, the electromagnet 36 is attached to the head pipe 11 and the magnetic member 31g is attached to the steering shaft 15. However, the magnetic member 31g may be attached to the head pipe 11 and the electromagnet 36 may be attached to the steering shaft 15. A damper effect can be provided also in this case.

According to the above-described preferred embodiment, the electromagnet 36, the magnetic member 31g, and the lid members 31 and 32 define the fluid storage chamber. However, lid members other than the lid members 31 and 32 may be used. In short, the lid members need only enclose the magnetic fluid in the gap between the electromagnet and the magnetic member. The shape and arranging position of the lid members are not limited.

According to the first preferred embodiment, the lid member 32 is attached directly to the head pipe 11. However, the lid member 32 may be attached indirectly to the head pipe 11 through a fixing member.

The lid member 31 may be formed integrally with the upper bracket 17. The lid member 32 may be formed integrally with the head pipe 11. The steering damper may be provided in the head pipe 11.

Second Preferred Embodiment

Figure 10:
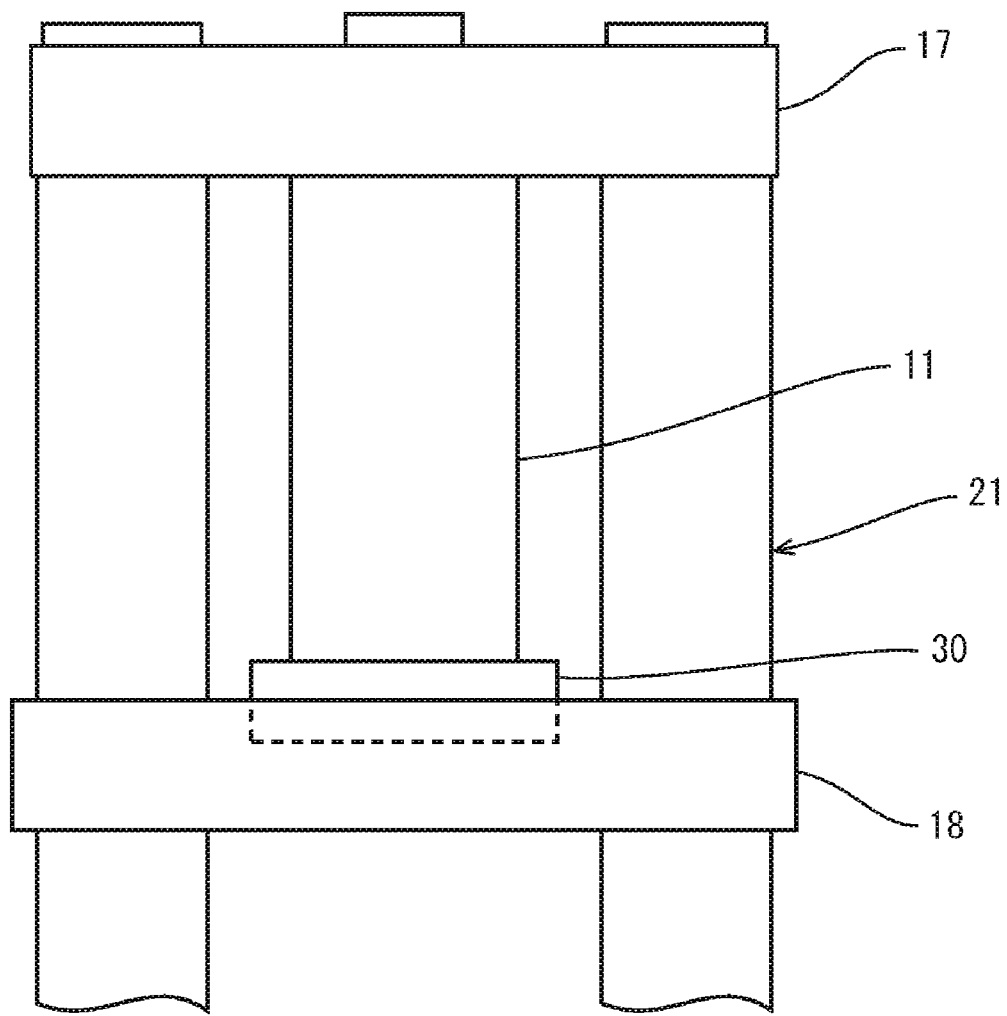
FIG. 10 is another front view of the head pipe and its periphery different from FIG. 3 according to a second preferred embodiment of the present invention.

The arranging position of the steering damper 30 is not limited as long as it is provided coaxially with the steering shaft 15. For example, as shown in FIG. 10, the steering damper 30 may be provided between the under bracket 18 and the head pipe 11. Preferably, the magnetic member 31g is attached to the steering shaft 15 and the electromagnet 36 is attached to the head pipe 11.

Third Preferred Embodiment

Figure 11:
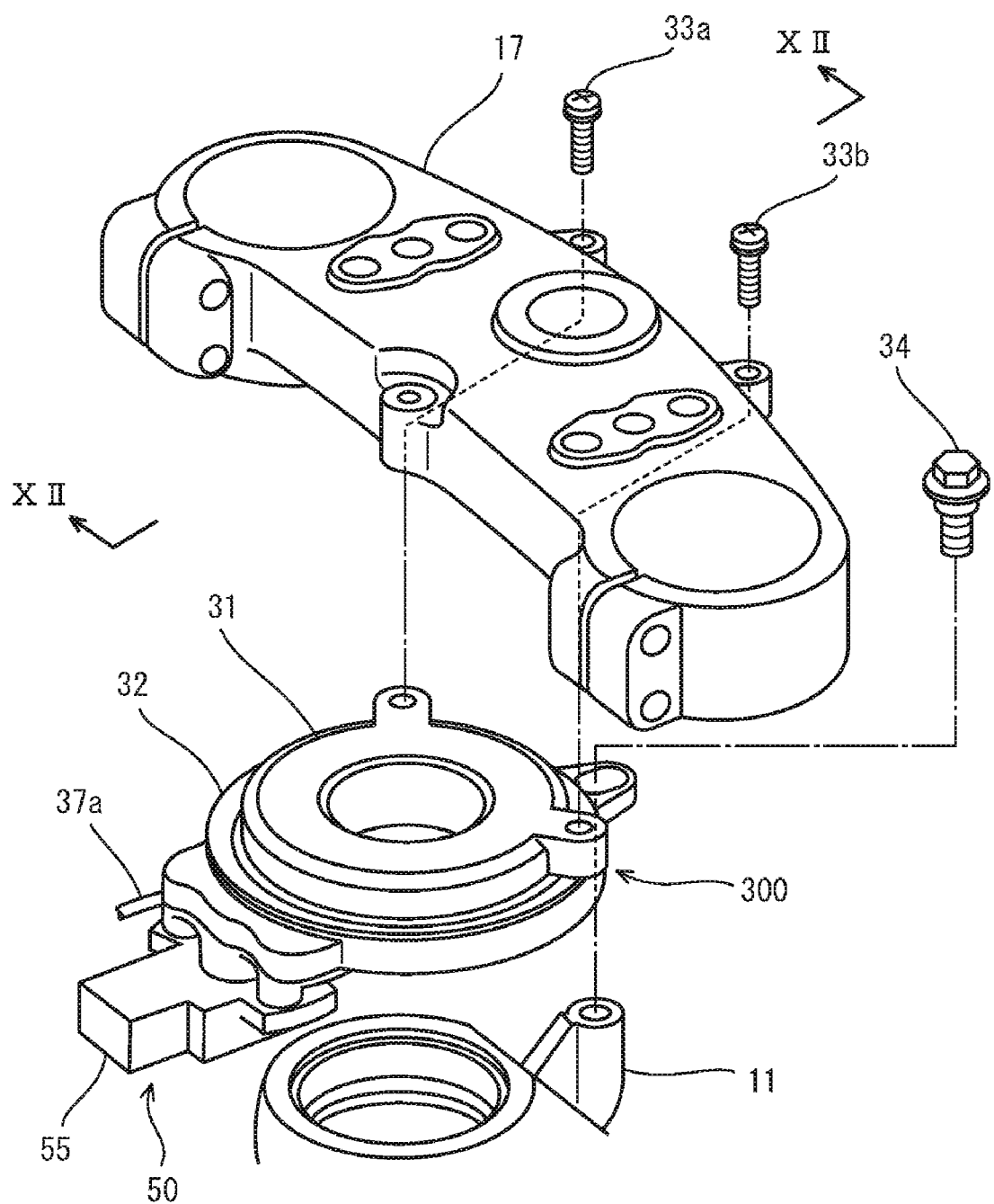
FIG. 11 is an exploded perspective view of a steering damper and its periphery in a saddle riding type vehicle according to a third preferred embodiment of the present invention.

FIG. 11 is an exploded perspective view of a steering damper and its periphery in a saddle riding type vehicle according to a third preferred embodiment of the present invention. The saddle riding type vehicle according to the third preferred embodiment includes a steering damper 300 instead of the steering damper 30 as compared to the saddle riding type vehicle 1. The other structure of the saddle riding type vehicle according to the third preferred embodiment is the same as that of the saddle riding type vehicle 1.

Referring to 11, the steering damper 300 additionally includes a detector 50 as compared to the steering damper 30. The other structure of the steering damper 300 is substantially the same as that of the steering damper 30.

Figure 12:
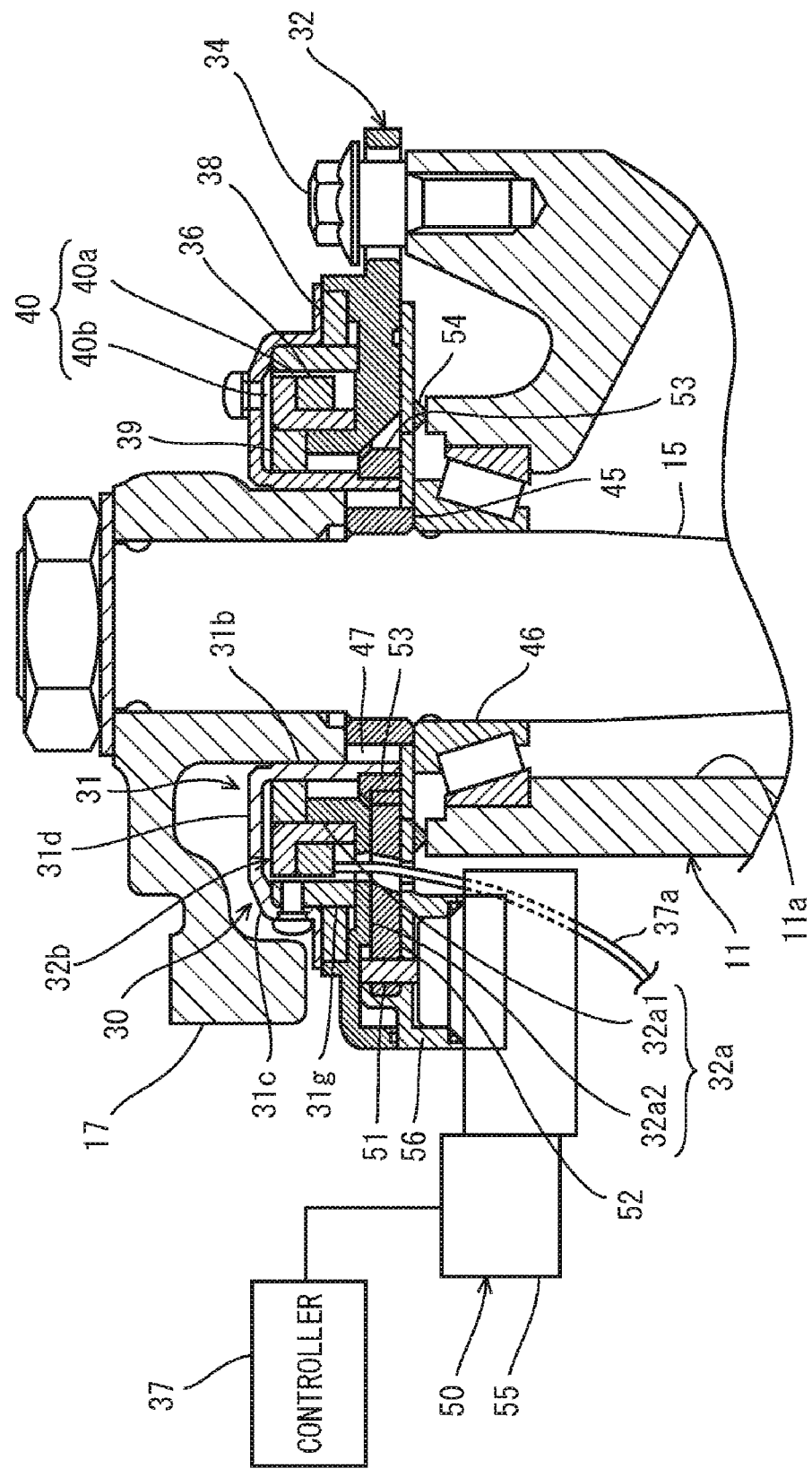
FIG. 12 is a sectional view taken along line XII-XII in FIG. 11.

FIG. 12 is a sectional view taken along line XII-XII in FIG. 11. Referring to FIG. 12, the detector 50 detects the steering angle of the steering shaft 15. The detector 50 is, for example, a potentiometer. The detector 50 is attached to the lid member 32. The detector 50 is further electrically connected to the controller 37. The detector 50 is connected to the controller 37, for example, by a wire.

The detector 50 includes a detector main body 55, a sector gear 52, a gear wheel 53, and a substrate 56. The detector main body 55 is provided on the lower surface of the substrate 56. The detector main body 55 further includes a well-known sensor that is not shown. The detector main body 55 further includes a rotation shaft 51. The substrate 56 has a through hole at a portion corresponding to the rotation shaft 51. The rotation shaft 51 is provided in the through hole and the upper end of the rotation shaft 51 is provided above the upper surface of the substrate 56. The detector main body 55 detects the steering angle of the steering shaft 15 and outputs the detected steering angle to the controller 37.

Figure 13:
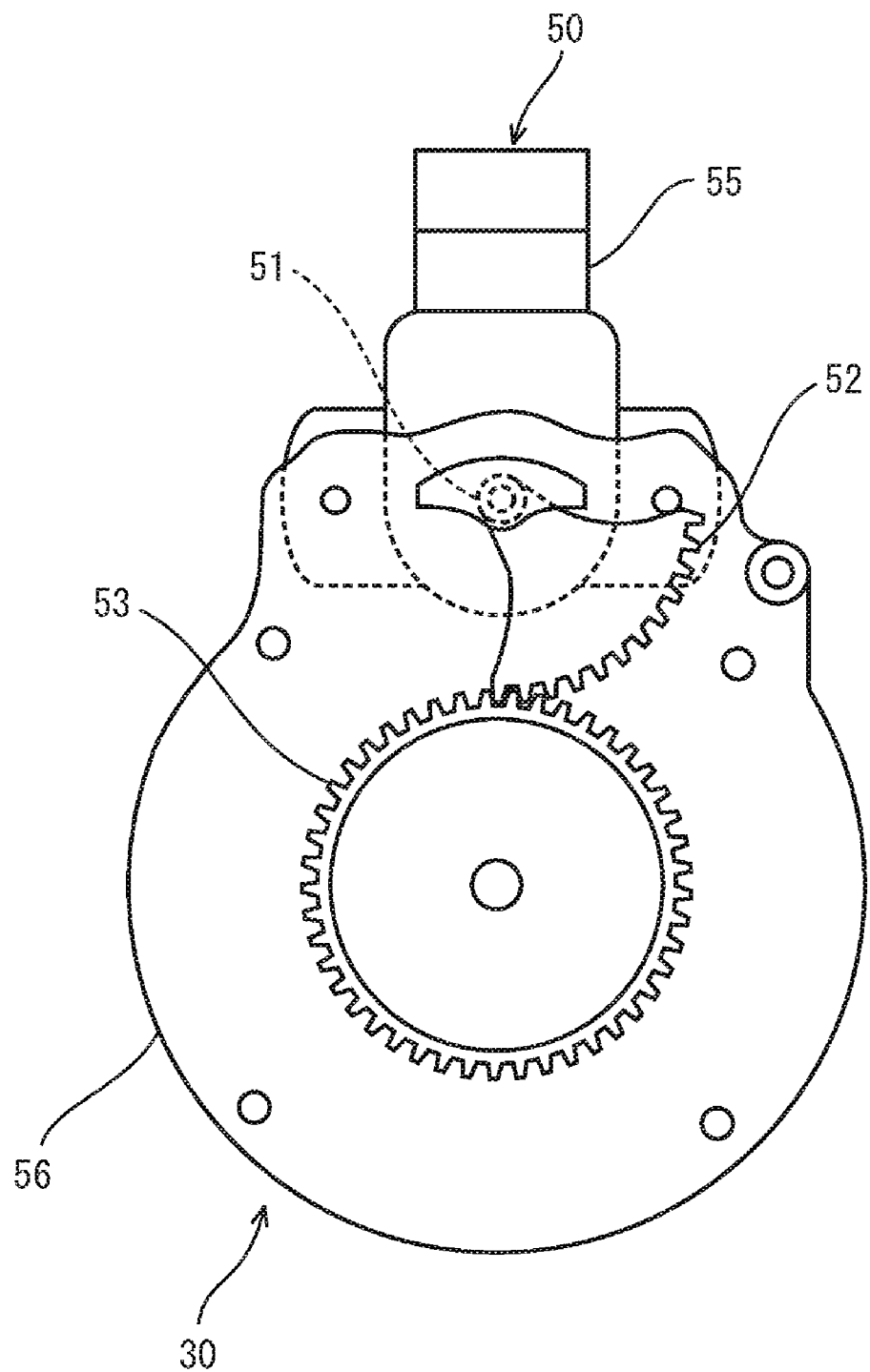
FIG. 13 is a plan view of a detector shown in FIG. 11.

FIG. 13 is a plan view of the detector 50. Referring to FIGS. 12 and 13, the sector gear 52 is provided on the upper surface of the substrate 56 and attached and fixed to the rotation shaft 51. The gear wheel 53 has a through hole. The gear wheel 53 is provided on the upper surface of the substrate 56. The substrate 56 has a through hole provided coaxially with the through hole of the gear wheel 53. The inner circumferential wall 31b of the lid member 31 is provided in the gear wheel 53. More specifically, the gear wheel 53 is attached to the lid member 31. Therefore, the gear wheel 53 is attached indirectly to the steering shaft 15.

The sector gear 52 and the gear wheel 53 are engaged with each other. As the steering shaft 15 rotates, the gear wheel 53 rotates in synchronization with the steering shaft 15. The sector gear 52 rotates in response to the rotation of the gear wheel 53. The rotation shaft 51 rotates in response to the rotation of the sector gear 52. The detector main body 55 detects the rotation angle of the rotation shaft 51 as the steering angle of the steering shaft 15.

The detector main body 55 outputs the detected steering angle to the controller 37. The controller 37 differentiates the steering angle with respect to time to obtain the steering speed of the steering shaft 15. The controller 37 further differentiates the steering speed with respect to time to obtain the steering acceleration. The controller 37 controls the amount of power to be supplied to the electromagnet 36 based on the steering speed and the steering acceleration. For example, as the steering speed and/or the steering acceleration becomes greater, the amount of power to be supplied is increased. The steering damper 300 changes the apparent viscosity of the magnetic fluid 41 in response to the steering speed and/or the steering acceleration of the steering shaft 15. Therefore, the steering damper 300 can adjust the damping force depending on the rotation of the steering shaft 15.

The steering damper 300 can preferably detect the steering angle of the steering shaft 15 with high precision. Referring to FIG. 12, an annular elastic member 54 is provided between the steering damper 300 including the detector 50 and the head pipe 11. The elastic member 54 is made of an elastic material such as rubber and synthetic resin. The elastic member 54 absorbs the vibration of the head pipe 11. For example, when the head pipe 11 vibrates according to the vibration of the engine 27, the vibration is not easily transmitted to the detector 50. Therefore, degradation in the detection precision of the steering angle attributable to the vibration can be reduced.

The elastic member 54 can further reduce changes in the thickness of the gap 40a in the steering damper 300 caused by the vibration of the engine 27 or the like.

According to the above-described preferred embodiment, the detector 50 is preferably attached to the steering damper 300. However, the detector 50 may be provided separately from the steering damper 300 rather than being attached to the steering damper 300.

Fourth Preferred Embodiment

Figure 14:
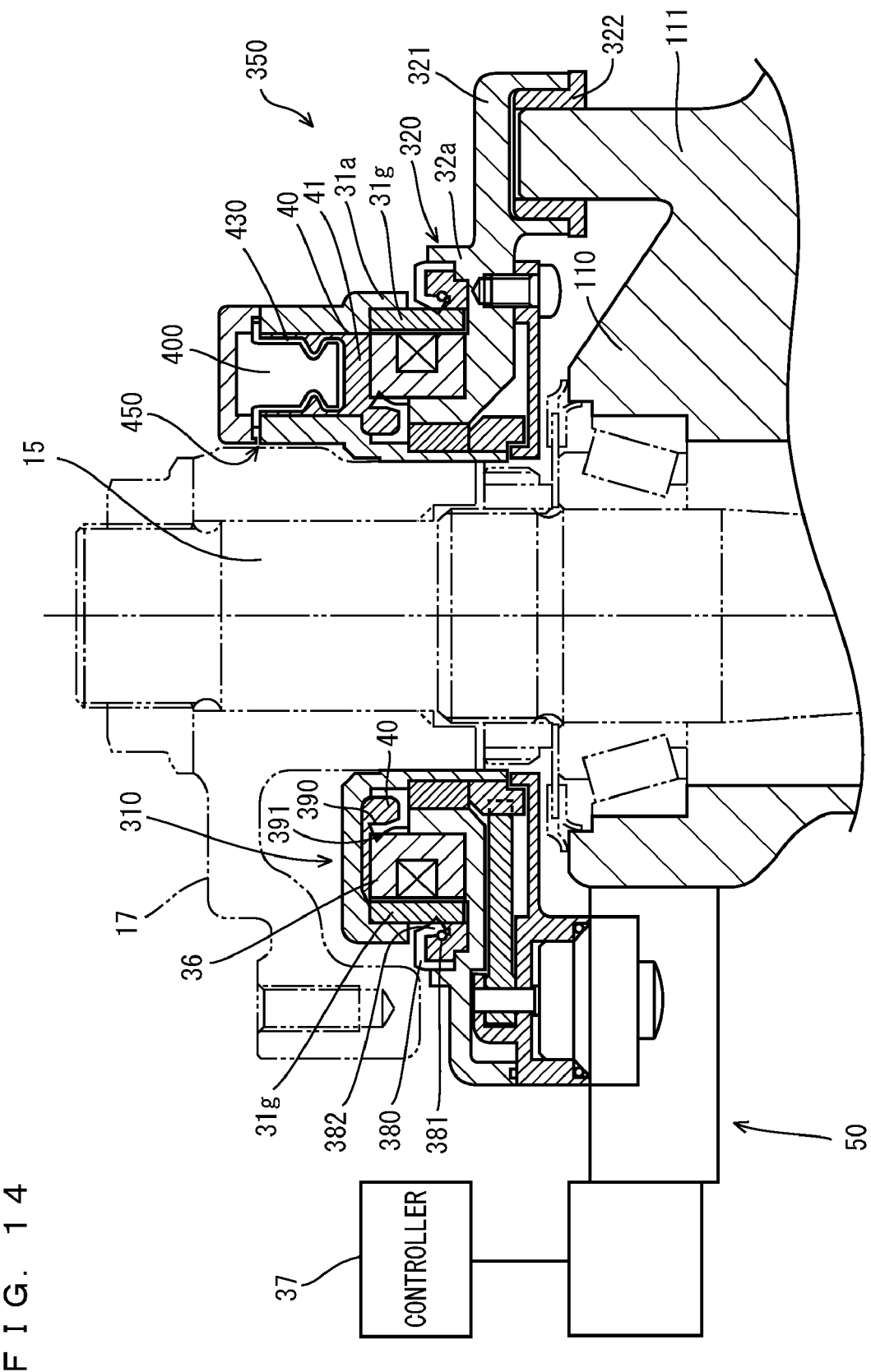
FIG. 14 is a sectional view of a steering damper and its periphery in a saddle riding type vehicle according to a fourth preferred embodiment of the present invention.

FIG. 14 is a sectional view of a steering damper and its periphery in a saddle riding type vehicle according to a fourth preferred embodiment of the invention. Referring to FIG. 14, the saddle riding type vehicle according to the fourth preferred embodiment includes a new steering damper 350 and a new head pipe 110 instead of the steering damper 30 and the head pipe 11 as compared to the saddle riding type vehicle 1. The steering damper 350 is provided at the upper end of the head pipe 110. The other structure of the saddle riding type vehicle according to the fourth preferred embodiment is the same as that of the saddle riding type vehicle 1.

The steering damper 350 includes new lid members 310 and 320 instead of the lid members 31 and 32 as compared to the steering damper 300. The steering damper 350 further includes new seal members 380 and 390 instead of the seal member 38 and 39.

Structure of Lid Member 310

The lid member 310 additionally includes a gas storage chamber 400 as compared to the lid member 31. The gas storage chamber 400 is formed at the substrate 31d. The gas storage chamber 400 is adjacent to the fluid storage chamber 40. The gas storage chamber 400 stores gas. In this example, the gas storage chamber 400 stores air. However, the gas storage chamber 400 may store other kinds of gas instead of air.

The gas storage chamber 400 and the fluid storage chamber 40 are partitioned by an elastic member 430. The elastic member 430 is, for example, a film of an elastic material such as a diaphragm made of an elastic material. Examples of the elastic material include rubber and synthetic resin. The gas storage chamber 400 is provided above the fluid storage chamber 40.

The magnetic fluid 41 expands or contracts depending on the temperature. When the magnetic fluid 41 is filled in the fluid storage chamber 40, the pressure of the fluid storage chamber 40 changes as the magnetic fluid 41 expands and contracts.

According to the present preferred embodiment, the gas storage chamber 400 reduces the pressure fluctuation of the fluid storage chamber 40. When the magnetic fluid 41 thermally expands, the elastic member 430 is raised upward by the thermally expanded magnetic fluid 41. Gas is stored in the gas storage chamber. Therefore, the capacity of the gas storage chamber 400 can be reduced to some extent. The capacity of the fluid storage chamber 40 increases for the reduction in the capacity of the gas storage chamber 400. Therefore, the gas storage chamber 400 can prevent an increase in the internal pressure of the fluid storage chamber 40 caused by the thermal expansion of the magnetic fluid 41.

The gas storage chamber 410 further has an opening 450 connected to the outside air. When the elastic member 430 is raised, the air in the gas storage chamber 410 is let outside through the opening 450. Therefore, the capacity of the fluid storage chamber 40 further increases.

When the magnetic fluid 41 thermally expands, the elastic member 430 is lowered. At the time, new air comes into the gas storage chamber 410 from the opening 450. Therefore, the capacity of the gas storage chamber 410 increases. On the other hand, the capacity of the fluid storage chamber 40 decreases. The gas storage chamber 400 therefore prevents a reduction in the internal pressure of the fluid storage chamber 40 caused by the thermal expansion of the magnetic fluid 41.

In FIG. 14, the elastic member 430 is provided between the gas storage chamber 400 and the fluid storage chamber 40. However, the elastic member 430 does not have to be provided between the gas storage chamber 400 and the fluid storage chamber 40. In this case, the gas storage chamber 400 is connected to the fluid storage chamber 40. The above-described effect can be obtained also in this case.

The seal member 380 is an annular elastic member. The seal member 380 is, for example, an oil seal. The seal member 380 includes a seal lip 382 and a garter spring 381. The seal lip 382 is formed at the inner circumferential surface of the seal member 380. The seal lip 382 is contacted to the magnetic member 31g to seal the fluid storage chamber 40. The garter spring 381 is provided at the outer circumference of the seal lip 382.

The seal member 390 is an annular elastic member. The seal member 390 is, for example, an oil seal. The seal member 390 includes a seal lip 391. The seal lip 391 is formed at the outer circumferential surface of the seal member 390. Therefore, the seal member 390 does not include a garter spring. The seal lip 391 is contacted to the inner circumferential surface of the electromagnet 36 and seals the liquid storage chamber 40.

The seal member 380 includes the seal lip 382 at the inner circumferential surface, and the seal member 390 includes the seal lip 391 at the outer circumferential surface. When the lid members 310 and 320 are combined, the seal lip 382 is easily close-contacted with the magnetic member 31g and the seal lip 391 is easily close-contacted with the electromagnet 36. Therefore, the air-tightness of the fluid storage chamber 40 improves.

The lid member 320 additionally includes a socket 321 as compared to the lid member 32. The socket 321 is formed at an edge of the main body 32a. The socket 321 has a non-penetrating hole opened downward. An annular bush 322 is provided in the socket 321. The bush 322 is made of resin having wear resistance.

The head pipe 110 additionally includes a pin 111 as compared to the head pipe 11. The pin 111 is rod-shaped and inserted into the bush 322. The outer size of the pin 111 is substantially the same as the inner size of the bush 322. The pin 111 is inserted and fixed in the bush 322. Therefore, the lid member 320 is attached to the head pipe 110 without using a bolt.

Using the pin 111 and the socket 321, the lid member 320 is not easily shifted in the horizontal direction. Therefore, the electromagnet 36 is not easily shifted in the horizontal direction, so that the steering damper 350 can generate a stable damping force.

According to the above-described preferred embodiments, the lid members 31, 32, 310, and 320 are preferably made of aluminum or an aluminum alloy, for example. However, the material of the lid member is not limited. At least one of the lid members 31 and 32 may be formed using a ferromagnetic material.

According to the above-described preferred embodiments, the gap 40a is preferably formed along the entire circumference of each of the steering dampers 30, 300, and 350. However, the gap 40a may be formed at a portion of the circumference of each of the steering dampers 30, 300, and 350.

According to the above-described preferred embodiments, the wear resistant member 35 or the seal members 38, 39, 380, and 391 are preferably used, but these members do not have to be used.

While preferred embodiments of the present invention have been described above, it is to be understood that variations and modification will be apparent to those skilled in the art without departing the scope and spirit of the present invention. The scope of the present invention, therefore, is to be determined solely by the following claims.

What is claimed is:

1. A saddle riding vehicle comprising:
   a vehicle body frame;
   a head pipe attached to a front end of the vehicle body frame;
   a steering shaft inserted rotatably in the head pipe; and
   a steering damper including:
      an electromagnet provided around the steering shaft and having a first surface;
      a magnetic member provided around the steering shaft and having a second surface opposed to the first surface of the electromagnet; and
      a magnetic fluid stored in a gap between the first surface and the second surface; wherein
      one of the electromagnet and the magnetic member is attached to the steering shaft, and the other of the electromagnet and the magnetic member is attached to the head pipe.

2. The saddle riding vehicle according to claim 1, wherein the electromagnet is annular and has a through hole into which the steering shaft is inserted;
   the magnetic member is annular and has a through hole into which the steering shaft is inserted; and
   one of the electromagnet and the magnetic member is provided in the through hole of the other.

3. The saddle riding vehicle according to claim 2, wherein the electromagnet is provided in the through hole of the magnetic member;
   the first surface is an outer circumferential surface of the electromagnet; and
   the second surface is an inner circumferential surface of the magnetic member.

4. The saddle riding vehicle according to claim 3, wherein the electromagnet is attached to the head pipe;
   the magnetic member is attached to the steering shaft; and
   the electromagnet is connected to a wire used to supply power to the electromagnet.

5. The saddle riding vehicle according to claim 4, further comprising:
   a first lid member provided above the gap;
   a second lid member provided under the gap; and
   a fluid storage chamber including the gap defined by the electromagnet, the magnetic member, and the first and second lid members; wherein
   the fluid storage chamber is arranged to store the magnetic fluid.

6. The saddle riding vehicle according to claim 5, wherein a gas storage chamber adjacent to the fluid storage chamber and including gas therein is provided at one of the first and second lid members.

7. The saddle riding vehicle according to claim 6, further comprising an elastic member arranged to partition the fluid storage chamber and the gas storage chamber.

8. The saddle riding vehicle according to claim 7, wherein the gas storage chamber includes an opening connected to an outside air source.

9. The saddle riding vehicle according to claim 1, further comprising:
   a detector arranged to detect a steering angle of the steering shaft; and
   a controller arranged and programmed to control power to be supplied to the electromagnet based on the steering angle detected by the detector.

10. The saddle riding according to claim 1, further comprising a lid member arranged to enclose the magnetic fluid in the gap.

11. A steering damper attached to a saddle riding vehicle comprising a vehicle body frame, a head pipe attached at a front end of the vehicle body frame, and a steering shaft inserted rotatably in the head pipe, the steering damper comprising:
   an electromagnet provided around the steering shaft and having a first surface;
   a magnetic material provided around the steering shaft and having a second surface opposed to the first surface of the electromagnet; and
   a magnetic fluid stored in a gap between the first surface and the second surface; wherein one of the electromagnet and the magnetic member is attached to the steering shaft, the other of the electromagnet and the magnetic member is attached to the head pipe.

12. The steering damper according to claim 11, wherein the electromagnet is annular and has a through hole into which the steering shaft is inserted;

the magnetic member is annular and has a through hole in which the steering shaft is inserted; and one of the electromagnet and the magnetic member is provided in the through hole of the other.

13. The steering damper according to claim 12, wherein the electromagnet is provided in the through hole of the magnetic member;

the first surface is an outer circumferential surface of the electromagnet; and the second surface is an inner circumferential surface of the magnetic member.

14. The steering damper according to claim 13, wherein the electromagnet is attached to the head pipe;

the magnetic member is attached to the steering shaft; and the electromagnet is connected to a wire used to supply power to the electromagnet.

15. The steering damper according to claim 14, further comprising:

a first lid member provided above the gap;

a second lid member provided under the gap; and a fluid storage chamber including the gap defined by the electromagnet, the magnetic member, and the first and second lid members; wherein the fluid storage chamber is configured to store the magnetic fluid.

16. The steering damper according to claim 15, wherein a gas storage chamber adjacent to the fluid storage chamber and including gas therein is provided at one of the first and second lid members.

17. The steering damper according to claim 16, further comprising an elastic member arranged to partition the fluid storage chamber and the gas storage chamber.

18. The steering damper according to claim 17, wherein the gas storage chamber includes an opening connected to an outside air source.

19. The steering damper according to claim 11, further comprising a detector arranged to detect a steering angle of the steering shaft.

20. The steering damper according to claim 11, further comprising a lid member arranged to enclose the magnetic fluid in the gap.

* * * * *